（12） United States Patent
Cheng et al.

(10) Patent No.: US 10,724,606 B1
(45) Date of Patent: Jul. 28, 2020

(54) CYCLOIDAL REDUCER

(71) Applicant: HIWIN TECHNOLOGIES CORP., Taichung (TW)

(72) Inventors: Hsu-Min Cheng, Taichung (TW); Cheng-Lung Wang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 16/827,721

(22) Filed: Mar. 24, 2020

Related U.S. Application Data

(63) Continuation-in-part of application No. 15/786,612, filed on Oct. 18, 2017.

(51) Int. Cl.
*F16H 1/32* (2006.01)
*F16D 3/04* (2006.01)

(52) U.S. Cl.
CPC ............. *F16H 1/32* (2013.01); *F16D 3/04* (2013.01); *F16H 2001/322* (2013.01)

(58) Field of Classification Search
CPC ............. F16H 1/32; F16H 1/2863; F16D 3/04
See application file for complete search history.

(56) References Cited

U.S. PATENT DOCUMENTS

| 3,063,265 | A | * | 11/1962 | Schmidt | F16D 3/04 464/102 |
| 5,486,144 | A | * | 1/1996 | Rennerfelt | F16D 3/04 475/179 |
| 5,498,215 | A | * | 3/1996 | Hosokawa | F16H 1/32 475/162 |
| 2015/0354667 | A1 | * | 12/2015 | Tesar | F16H 1/32 475/180 |
| 2017/0241761 | A1 | * | 8/2017 | Kosaka | G01L 5/0019 |
| 2017/0271948 | A1 | * | 9/2017 | Tesar | H02K 5/161 |

* cited by examiner

*Primary Examiner* — Stacey A Fluhart
(74) *Attorney, Agent, or Firm* — Leong C. Lei (57) ABSTRACT

A cycloidal reducer includes a housing, an input bushing mounted in the housing for input of a rotational force, and two speed-reduced output units, each of which includes a cycloidal disc, an output member, a cross Oldham coupling member, and a plurality of rolling elements. The cycloidal disc is mounted to the input bushing and has troughs formed in an end face thereof and each having a sidewall forming an inclined surface. The output member has troughs formed in an end face thereof. The cross Oldham coupling member has coupling sections, each having a sidewall forming an inclined surface. The coupling sections are respectively received in the troughs of the cycloidal disc and the output member. The rolling elements are arranged between the inclined surfaces of the cycloidal disc and the cross Oldham coupling member and between the sidewalls of the output member and the cross Oldham coupling member.

8 Claims, 10 Drawing Sheets

CYCLOIDAL REDUCER

CROSS-REFERENCE TO RELATED APPLICATION

This is a continuation-in-part of co-pending U.S. patent application Ser. No. 15/786,612 filed on Oct. 18, 2017.

(a) TECHNICAL FIELD OF THE INVENTION

The present invention generally relates to a cycloidal reducer, and more particularly to a cycloidal reducer that is capable of enhanced assembly efficiency and reduction of assembly cost.

(b) DESCRIPTION OF THE PRIOR ART

A cycloidal reducer is one of the most common speed reduction mechanisms, in which an eccentric input is transmitted by means of tooth difference to achieve an output of a reduced speed.

The structure of a known cycloidal reducer is that non-coaxial transmission is made between a cycloidal disc and an output member (which is in the form of a flange) by means of a cross Oldham coupling member. Thus, it is necessary to provide rolling elements (such as cylindrical rollers) between the cycloidal disc and the cross Oldham coupling member and between the cross Oldham coupling member and the output member in order to reduce power loss. In other words, the cycloidal disc and the output member are both provided with troughs formed therein to receive parts of the cross Oldham coupling member to fit therein and the rolling elements are disposed between sidewalls of the parts of the cross Oldham coupling member and the sidewalls of the troughs of the cycloidal disc and the sidewalls of the troughs of the output member. However, the sidewalls of the parts of the cycloidal disc troughs and the sidewalls of the output member troughs and the sidewalls of the cross Oldham coupling member are each parallel with the axis direction. To assemble, the rolling elements are first positioned against the sidewalls of the troughs of the cycloidal disc and then, the cross Oldham coupling member is set therein, or the rolling elements are first positioned against the sidewalls of the parts of the cross Oldham coupling member and then, the output member is set therein. Both ways are easy to cause impact to the rolling elements during the assembly. This may cause tipping of the rolling elements and re-positioning is necessary for the assembly operation. This leads to a lower efficiency of assembly and extension of assembly time, and may even cause undesired damages to the rolling elements, the cycloidal disc, the cross Oldham coupling member, and the output member.

Thus, one of the common solutions is to expand the width of the troughs of the cycloidal disc and the output member to allow for easy disposition and assembly of the rolling elements. This, however, increases the plays between the components and the backlash is expanded, making it easy to generate dead strokes during rotation and drawbacks, such as poor positioning accuracy and increased impact noise, may be caused.

JP1990266114A teaches a roller arranged in a trough which has a slope side surface. An end surface of the roller is in a condition of being in contact with a bottom surface of the trough and a conjunction between the bottom surface and slope side surface of the trough may have contact friction with a rounded edge of the roller, so as to loss more mechanical efficiency.

SUMMARY OF THE INVENTION

In view of the above, this invention is made to improve the prior art by overcoming the problems that the conventional cycloidal reducer has poor assembly efficiency, extended assembly time, being easy to cause damages to the components thereof during assembly, expanded backlash, having dead strokes, poor positioning accuracy, and increased impact noise. Thus, the present invention provides a cycloidal reducer, which generally comprises: a housing, which comprises an axial mounting hole and an internal ring gear formed on an inner circumferential surface of the axial mounting hole; an input bushing, which is mounted in the axial mounting hole of the housing for input of a rotational force; and two speed-reduced output units, which are arranged in the axial mounting hole of the housing, the two speed-reduced output units being arranged in opposite directions of a common axis, each of the speed-reduced output units comprising a cycloidal disc, an output member, a cross Oldham coupling member, and a plurality of rolling elements, the cycloidal disc comprising a mounting hole extending therethrough in an axial direction, an external ring gear formed on an outer circumferential surface thereof, and a plurality of cycloidal disc troughs formed in an end face of the cycloidal disc as recessing in the axial direction, the mounting hole receiving the input bushing to fit therein, the external ring gear being set in engagement with the internal ring gear of the housing, each of the cycloidal disc troughs having sidewalls of which one is formed as an inclined surface, the output member having an end face that comprises a plurality of output member troughs formed therein as recessing in the axial direction, the cross Oldham coupling member comprising a central ring section and four coupling sections extending radially from the central ring section in the form of a cross, each of the coupling sections having sidewalls of which one is formed as an inclined surface, two of the coupling sections of the cross Oldham coupling member being respectively received in the cycloidal disc troughs of the cycloidal disc, the other two of the coupling sections of the cross Oldham coupling member being respectively received in the output member troughs of the output member, the rolling elements being arranged between the inclined surfaces of the cycloidal disc and the inclined surfaces of the cross Oldham coupling member and between the sidewalls of the output member troughs of the output member and the sidewalls of the coupling sections of the cross Oldham coupling member. With such an arrangement, effects of enhancing assembly efficiency, reducing transmission backlash, eliminating dead strokes, improving positioning accuracy, and reducing impact noise can be achieved.

The present invention also provides a cycloidal reducer, which generally comprises: a housing, which comprises an axial mounting hole and an internal ring gear formed on an inner circumferential surface of the axial mounting hole; an input bushing, which is mounted in the axial mounting hole of the housing for input of a rotational force; and two speed-reduced output units, which are arranged in the axial mounting hole of the housing, the two speed-reduced output units being arranged in opposite directions of a common axis, each of the speed-reduced output units comprising a cycloidal disc, an output member, a cross Oldham coupling member, and a plurality of rolling elements, the cycloidal disc comprising a mounting hole extending therethrough in an axial direction, an external ring gear formed on an outer circumferential surface thereof, and a plurality of cycloidal disc troughs formed in an end face of the cycloidal disc as recessing in the axial direction, the mounting hole receiving the input bushing to fit therein, the external ring gear being set in engagement with the internal ring gear of the housing, the output member having an end face that comprises a plurality of output member troughs formed therein as recessing in the axial direction, each of the output member troughs having sidewalls of which one is formed as an inclined surface, the cross Oldham coupling member comprising a central ring section and four coupling sections extending radially from the central ring section in the form of a cross, each of the coupling sections having sidewalls of which one is formed as an inclined surface, two of the coupling sections of the cross Oldham coupling member being respectively received in the cycloidal disc troughs of the cycloidal disc, the other two of the coupling sections of the cross Oldham coupling member being respectively received in the output member troughs of the output member, the rolling elements being arranged between the sidewalls of the cycloidal disc troughs of the cycloidal disc and the sidewalls of the coupling sections of the cross Oldham coupling member and between the inclined surfaces of the output member and the inclined surfaces of the cross Oldham coupling member. With such an arrangement, effects of enhancing assembly efficiency, reducing transmission backlash, eliminating dead strokes, improving positioning accuracy, and reducing impact noise can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-5, the present invention provides, in a preferred embodiment, a cycloidal reducer 100, which generally comprises a housing 10, an input bushing 20, and two speed-reduced output units 30.

Referring to FIGS. 1-5, the housing 10 comprises an axial mounting hole 11 and an internal ring gear 12 formed on an inner circumferential surface of the axial mounting hole 11.

Referring to FIGS. 1-5, the input bushing 20 comprises a bushing 21, two eccentric collars 22 mounted on the bushing 21, and two bearings 23 respectively mounted on the eccentric collars 22. The input bushing 20 is mounted in the axial mounting hole 11 of the housing 10 for input of a rotational force.

Referring to FIGS. 1-5, the two speed-reduced output units 30 are arranged in the axial mounting hole 11 of the housing 10 and the two speed-reduced output units 30 are arranged in opposite directions of a common axis. Each of the speed-reduced output units 30 comprises a cycloidal disc 31, an output member 32, a cross Oldham coupling member 33 and a plurality of rolling elements 34. The cycloidal disc 31 comprises a mounting hole 311 extending therethrough in an axial direction, an external ring gear 312 formed on an outer circumferential surface thereof, and a plurality of cycloidal disc troughs 313 formed in an end face of the cycloidal disc 31 as recessing in the axial direction. The mounting hole 311 receives the bearing 23 of the input bushing 20 to fit therein and the external ring gear 312 is set in mating engagement with the internal ring gear 12 of the housing 10. Each of the cycloidal disc troughs 313 has sidewalls of which one is formed as an inclined surface 314 and the inclined surface 314 defines an angle of 1 to 18 degrees with respect to an axial direction of the cycloidal disc 31. The output member 32 is made in the form of a flange, which has an end face that comprises a plurality of output member troughs 321 formed therein as recessing in the axial direction. The output member troughs 321 each have sidewalls of which one is formed as an inclined surface 322, and the inclined surface 322 defines an angle of 1 to 18 degrees with respect to an axial direction of the output member 32. The cross Oldham coupling member 33 forms an Oldham coupling in the form of a cross and comprises a central ring section 331 and four coupling sections 332 extending radially from the central ring section 331 in the form of a cross. The coupling sections 332 are each angularly spaced from each other by 90 degrees. Each of the coupling sections 332 has sidewalls of which one is formed as an inclined surface 333, and the inclined surface 333 defines an angle of 1 to 18 degrees with respect an axial direction of the cross Oldham coupling member 33. Two of the coupling sections 332 of the cross Oldham coupling member 33 are respectively received in the cycloidal disc troughs 313 of the cycloidal disc 31 and another two of the coupling sections 332 of the cross Oldham coupling member 33 are respectively received in the output member troughs 321 of the output member 32. The rolling elements 34 are generally cylindrical rollers arranged between the sidewalls of the cycloidal disc troughs 313 of the cycloidal disc 31 and the sidewalls of the coupling sections 332 of the cross Oldham coupling member and also arranged between the sidewalls of the output member troughs 321 of the output member 32 and the sidewalls of the coupling sections 332 of the cross Oldham coupling member 33.

The above provides a description to the components of the cycloidal reducer 100 according to a preferred embodiment of the present invention and the assembly thereof. The following will provide a description to the operation and features of the reducer.

Firstly, since one of the sidewalls of each of the cycloidal disc troughs 313 of the cycloidal disc 31 is an inclined surface 314 and one of the sidewalls of each of the coupling sections 332 of the cross Oldham coupling member 33 is an inclined surface 333, when the rolling elements 34 are set in the cycloidal disc troughs 313 and in contact engagement with the inclined surface 314, an axial direction of the rolling elements 34 is at inclination of 1 to 18 degrees with respect to the axial direction of the cycloidal disc 31. In this way, when the coupling sections 332 of the cross Oldham coupling member 33 are put into the cycloidal disc troughs 313 of the cycloidal disc 31, the inclined angle at which the rolling elements 34 are set provides an effect of eliminating direct impact with the rolling elements 34 during the assembly of the cross Oldham coupling member 33 with the cycloidal disc 31. As such, the efficiency of assembly can be enhanced and failure rate of assembly can be reduced to thereby greatly shorten the time of assembly and reduce potential damage to the components and thus reducing assembly cost. Further, since the inclination angle of the inclined surface 314 formed on the sidewall of each of the cycloidal disc troughs 313 of the cycloidal disc 31 is identical to the inclination angle of the inclined surface 333 formed on the sidewall of each of the coupling sections 332 of the cross Oldham coupling member 33, there is no need to expand the trough width of the cycloidal disc troughs 313 as what is necessary in the prior art so that rigidity and positioning accuracy can be improved to prevent dead stroke and reduce noise.

Further, since one of the sidewalls of the output member troughs 321 of the output member 32 is an inclined surface 322 and one of the sidewalls of each of the coupling sections 332 of the cross Oldham coupling member 33 is an inclined surface 333, when the rolling elements 34 are set on the sidewall of the coupling sections 332 and in contact engagement with the inclined surface 333, an axial direction of the rolling elements 34 is at inclination of 1 to 18 degrees with respect to the axial direction of the cross Oldham coupling member 33. In this way, when the output member troughs 321 of the output member 32 are set to mate the coupling sections 332 of the cross Oldham coupling member 33, the inclined angle at which the rolling elements 34 are set provides effects of preventing direct impact on the rolling elements 34 during the assembly of the cross Oldham coupling member 33 with the output member 32 and improving rigidity and positioning accuracy to prevent dead stroke and reduce noise.

Figure 8:
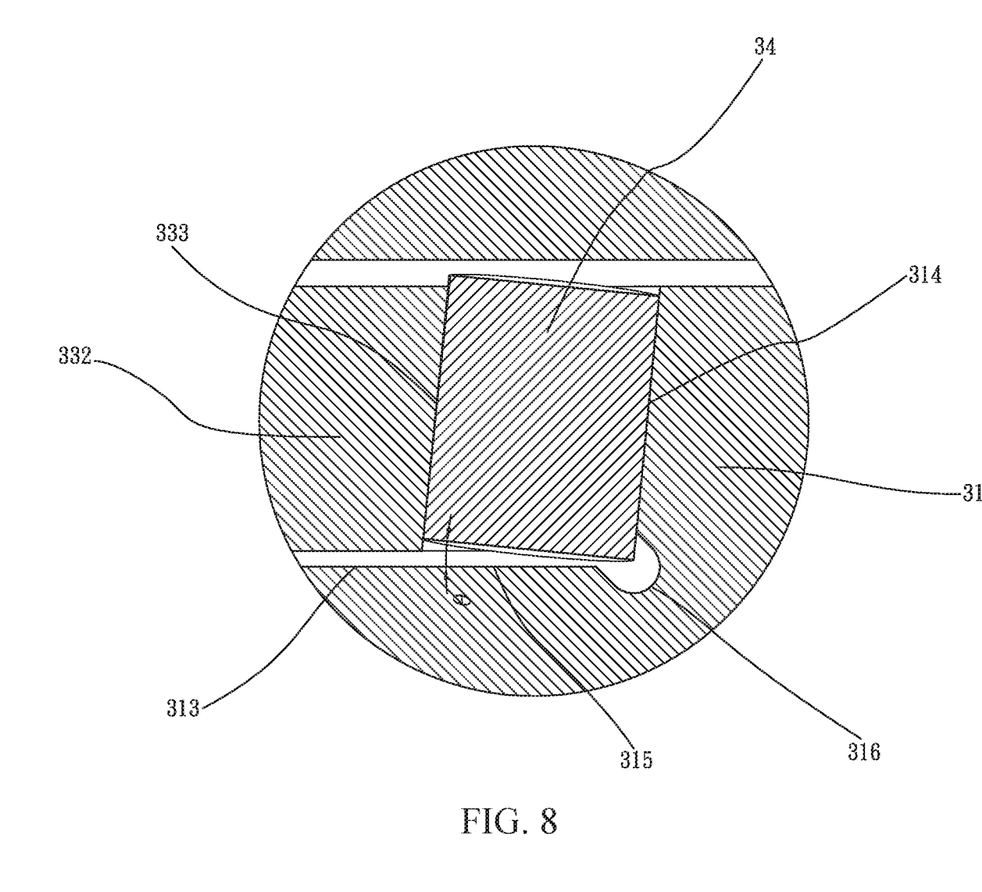
FIG. 8 is an enlarged view of a portion of FIG. 7.

Next, as shown in FIG. 8, the cycloidal disc trough 313 of the cycloidal disc 31 has a bottom wall which forms a planar surface 315. The planar surface 315 is connected to the inclined surface 314 with an obtuse angle formed therebetween. An escape groove 316 is formed between the planar surface 315 and the inclined surface 314 in a recessed form. As such, an end face of the rolling element 34 and the planar surface 315 form a gap therebetween and do not contact each other, so as to define an included angle θ therebetween (θ being in a range between 1 degree and 18 degrees, preferably between 5 degrees and 15 degrees). This sets the rolling element 34 in linear contact with the inclined surface 314 and the inclined surface 333. Further, the arrangement of the escape groove 316 helps prevent a rounded edge of the rolling element 34 from contacting the planar surface 315 of the cycloidal disc trough 313 to thereby effectively reduce mechanical loss.

Figure 9:
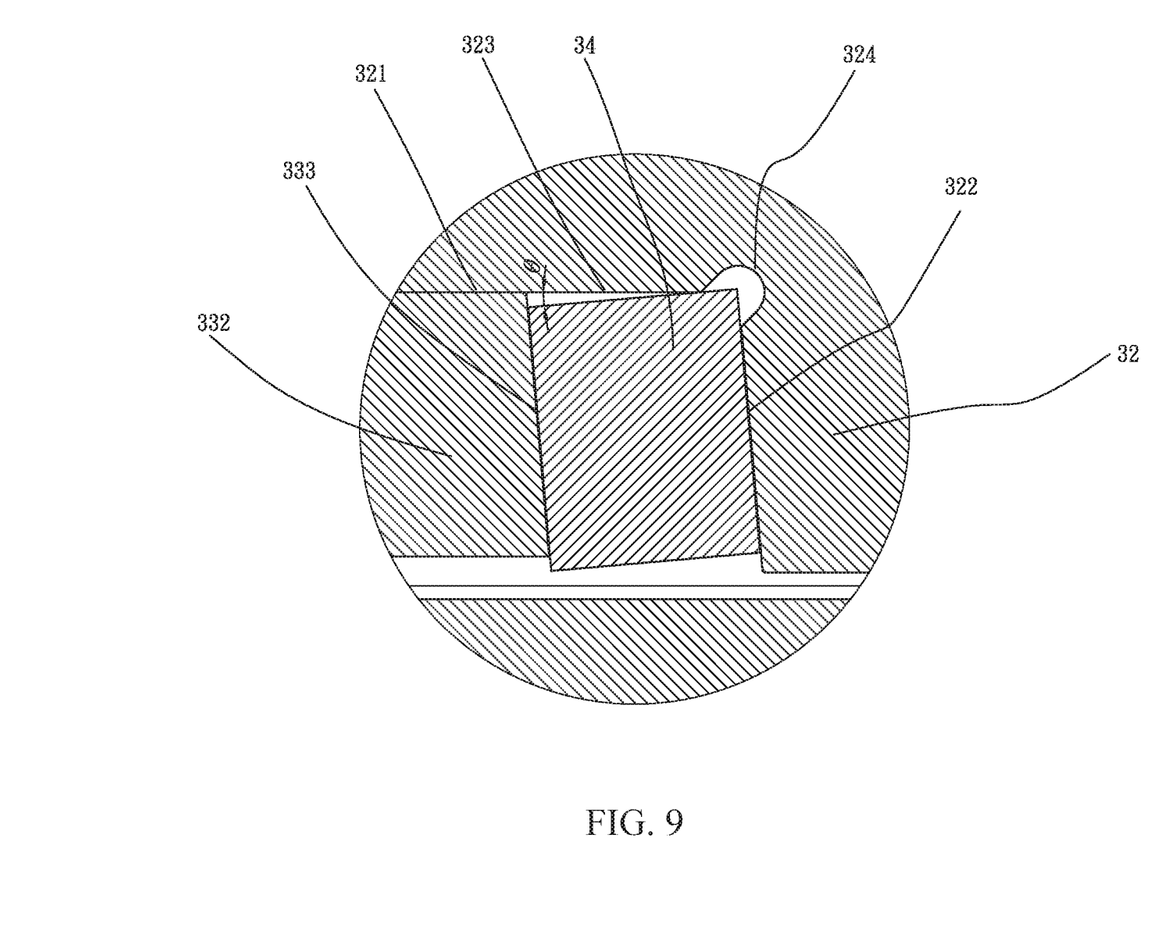
FIG. 9 is an enlarged view of a portion of FIG. 4.

As shown in FIG. 9, the output member trough 321 of the output member 32 has a bottom wall, which also forms a planar surface 323. The planar surface 323 is connected to the inclined surface 322 with an obtuse angle formed therebetween. An escape groove 324 is formed between the planar surface 323 and the inclined surface 322 in a recessed form. As such, an end face of the rolling element 34 and the planar surface 323 form a gap therebetween and do not contact each other, so as to define an included angle θ therebetween (θ being in a range between 1 degree and 18 degrees, preferably between 5 degrees and 15 degrees). This sets the rolling element 34 in linear contact with the inclined surface 322 and the inclined surface 333. Further, the arrangement of the escape groove 324 helps prevent a rounded edge of the rolling element 34 from contacting the planar surface 323 of the output member trough 32 to thereby effectively reduce mechanical loss.

Figure 10:
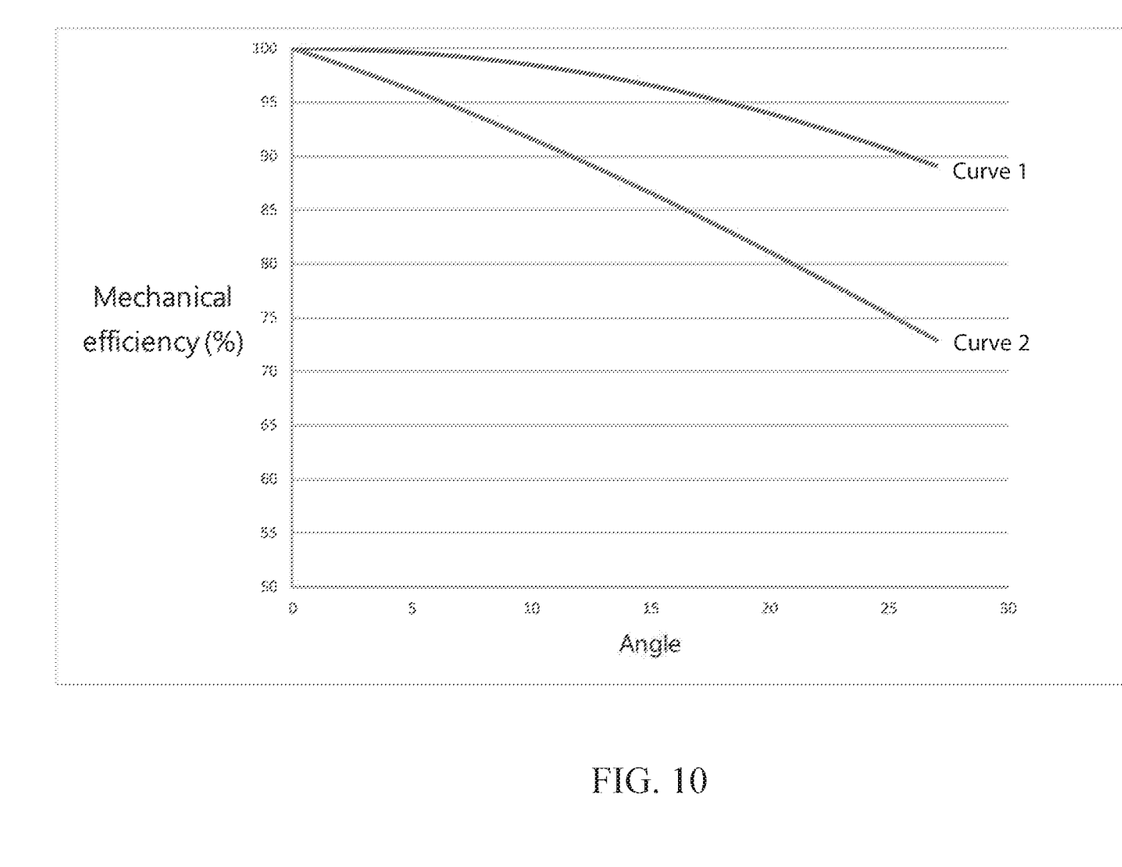
FIG. 10 is a plot showing mechanical efficiency curves of the present invention and the prior art.

Further, experiments reveal the no-contact arrangement between the end face of the rolling element 34 and the planar surface 323 according to the present invention makes the mechanical efficiency of the present invention different from the mechanical efficiency of the arrangement of the prior art JP1990266114A teaching a combination of a rolling element 8 and an output member 3 (see FIG. 2 of the prior art document). As shown in FIG. 10, the no-contact arrangement of the end face of the rolling element 34 and the planar surface 323 according to the present invention (Curve 1) demonstrates a mechanical efficiency that is superior, in all values of the included angle, to that of a contacting arrangement (Curve 2). Further, when θ is set in the range of 1 degree to 18 degrees, the present invention (Curve 1) suffers at most a mechanical loss of 5% and could maintain a mechanical efficiency of at least 95%; and when θ is in the range of 5 degrees and 15 degrees (5 degrees, 10 degrees, and 15 degrees, in particular), a cutter for making the cycloidal disc trough 313 and the output member trough 321 can be fabricated in an easier way and a dresser can be custom-made. In the arrangement of JP1990266114A, in which the end face of the rolling element 8 is set in contact with the output member 3, the mechanical efficiency may be lowered to 82% when θ (which is an included angle between an inclined surface of the output member 3 that contacts the end face of the rolling element 8 and a radial direction of the output member 3) is in the range of 1 degree to 18 degree. This is obviously inferior to that of the present invention.

Figure 1:
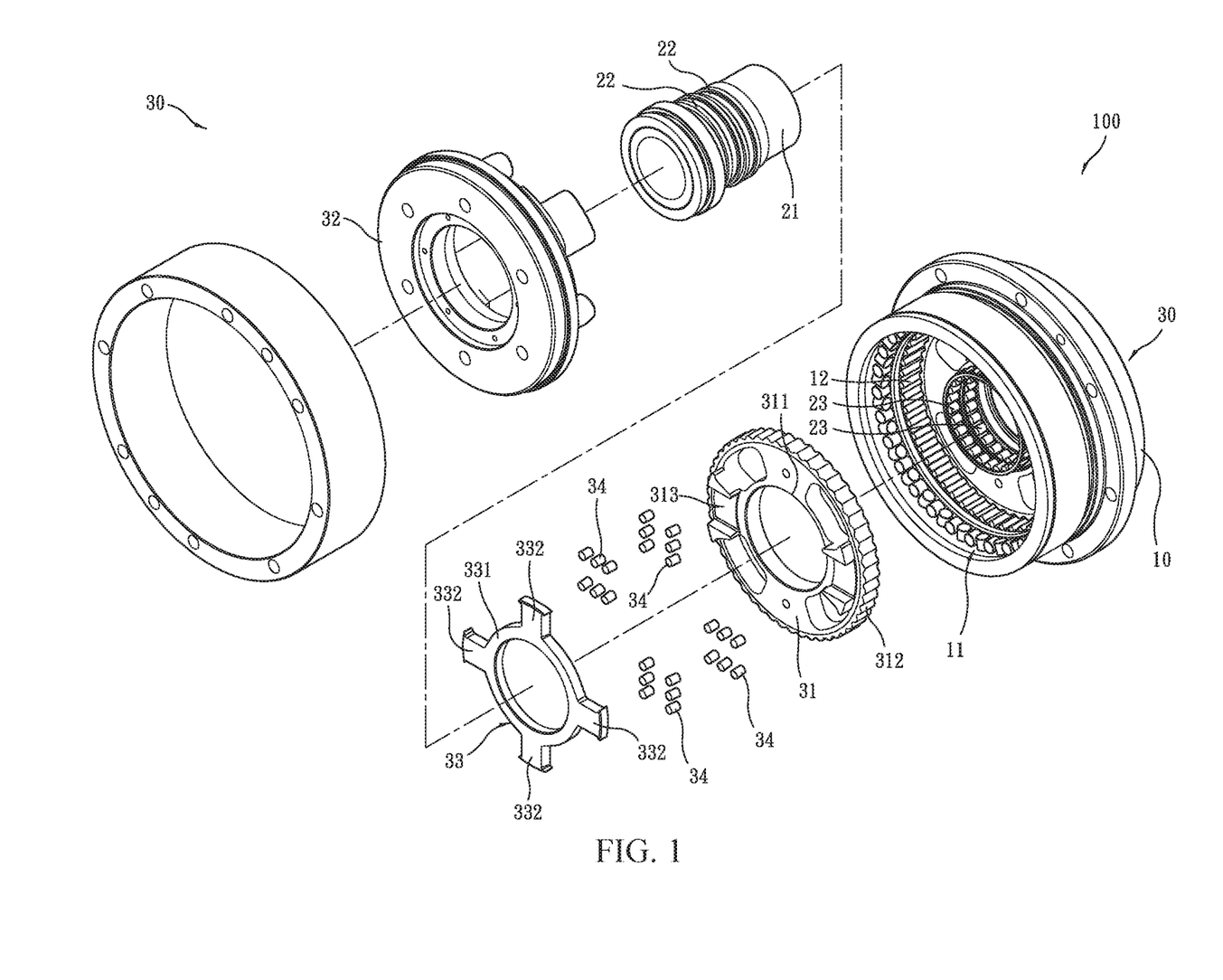
FIG. 1 is an exploded view showing a preferred embodiment of the present invention.
Figure 2:
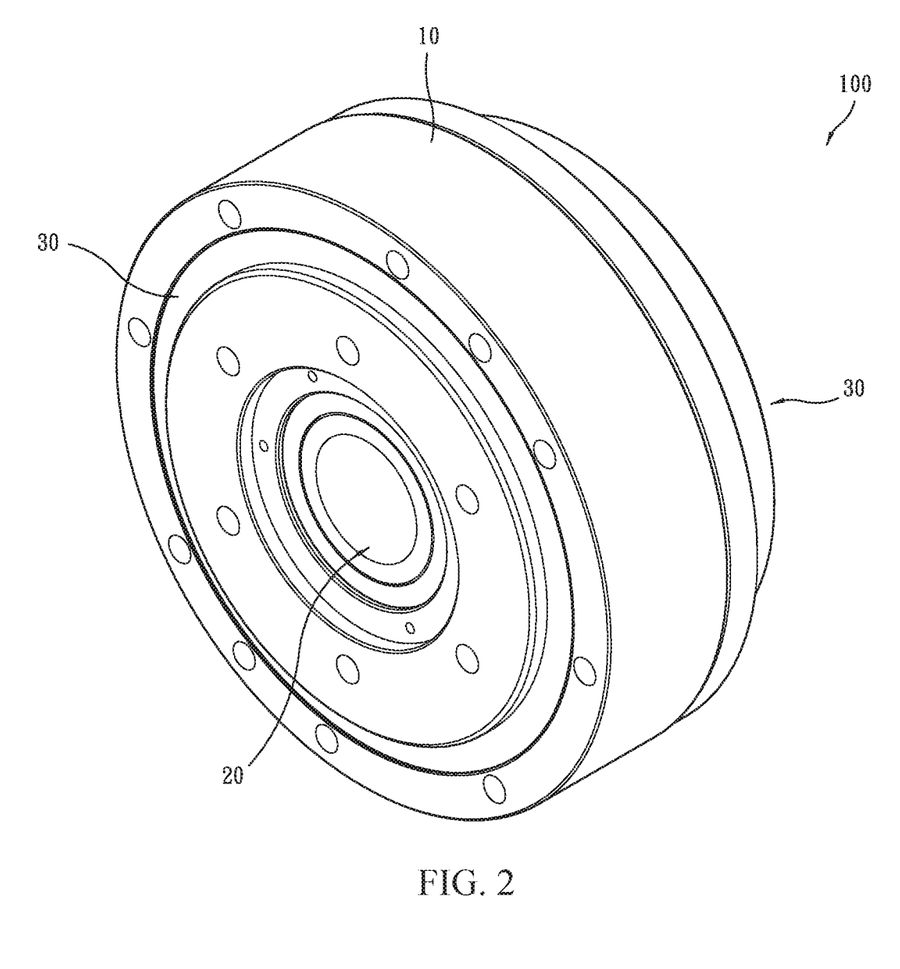
FIG. 2 is an assembled view of the embodiment of FIG. 1.
Figure 3:
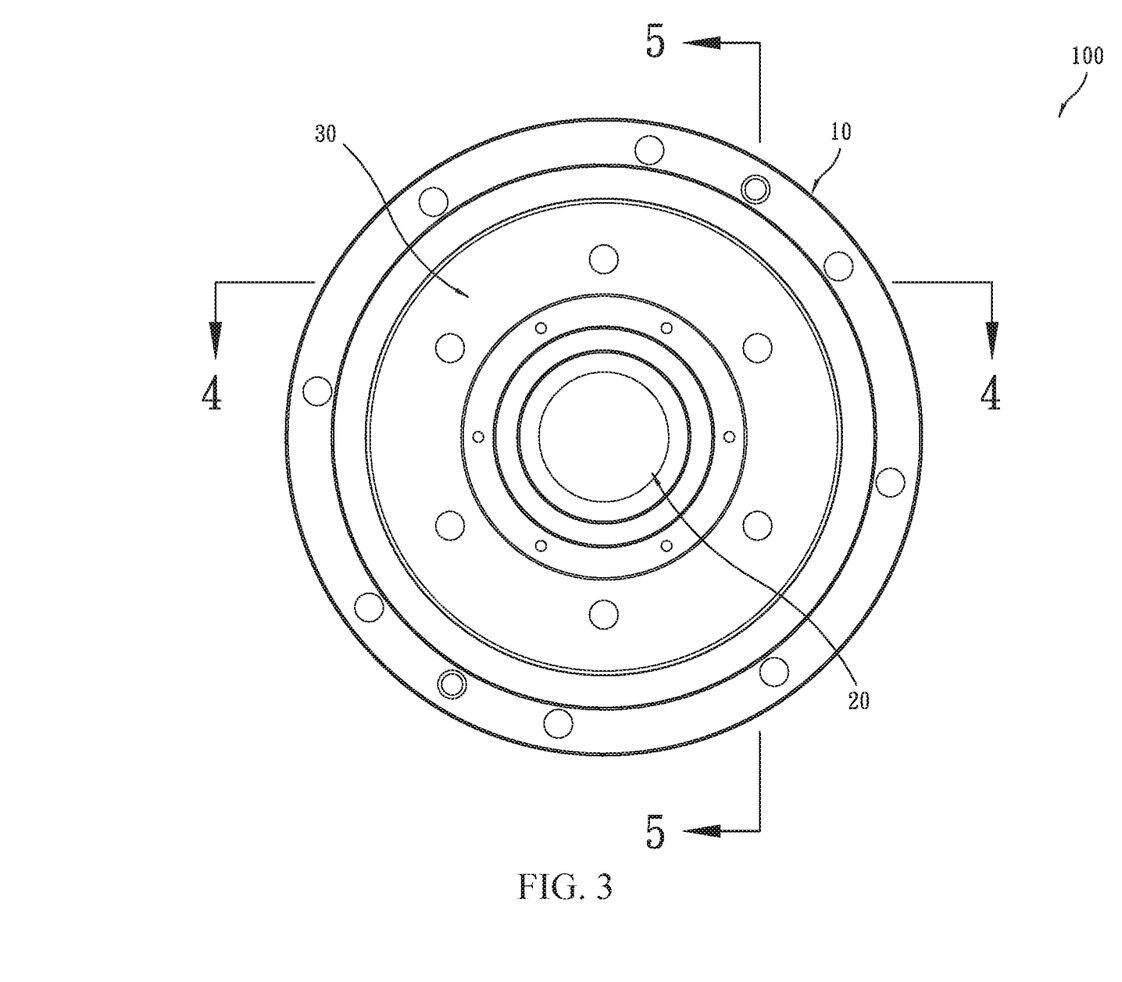
FIG. 3 is an end view of the embodiment of FIG. 1.
Figure 4:
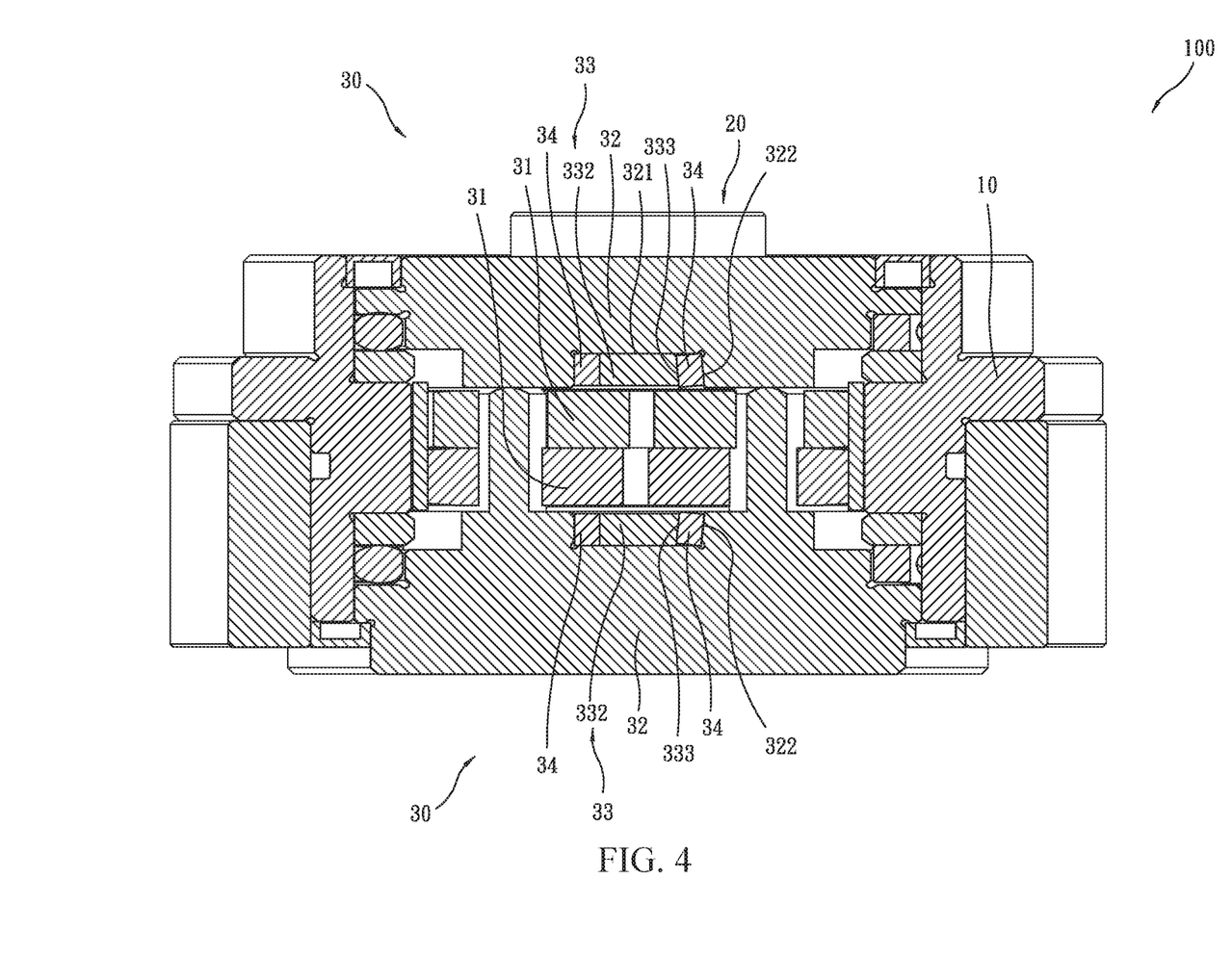
FIG. 4 is a cross-sectional view taken along line 4-4 of FIG. 3.
Figure 5:
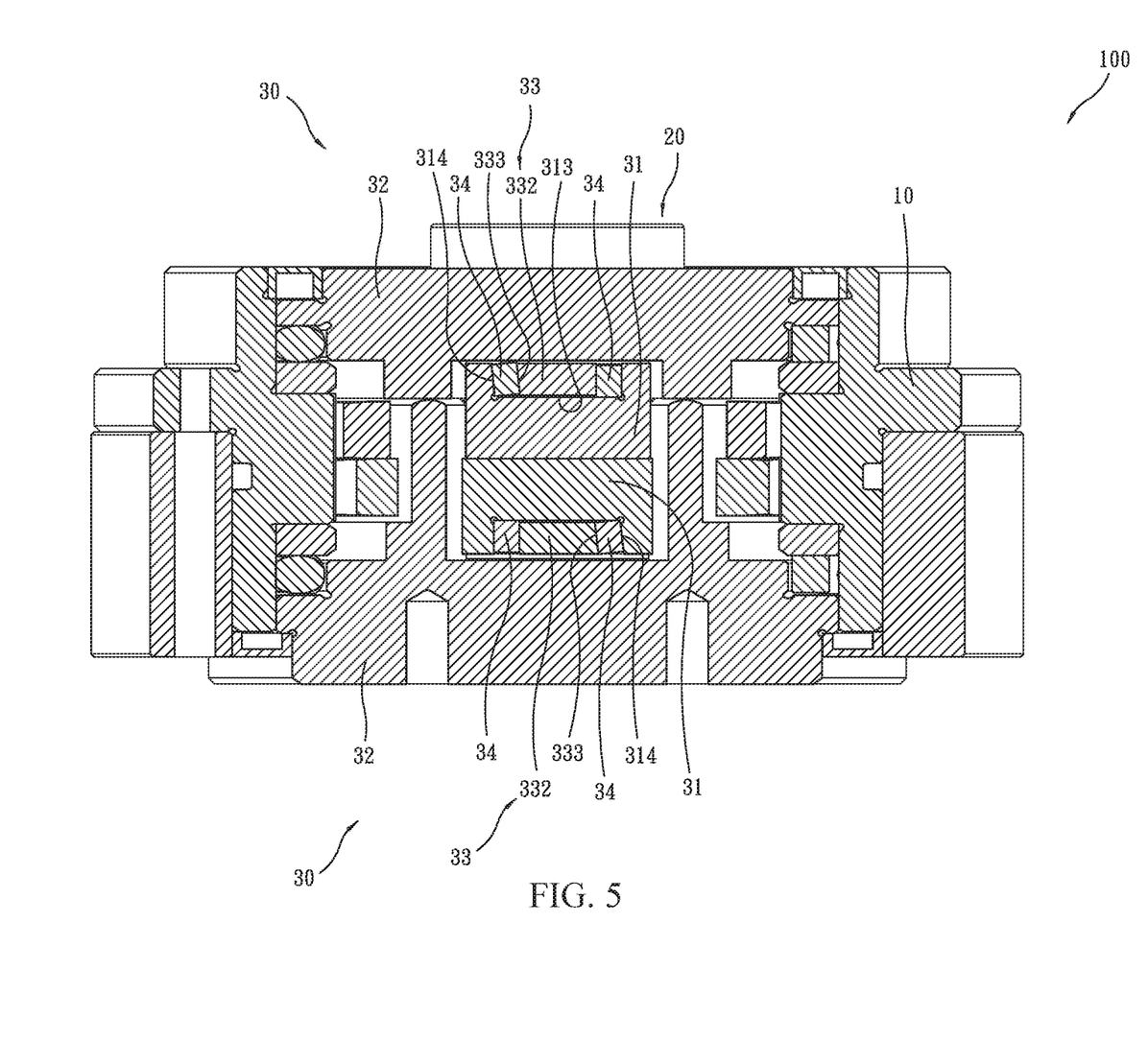
FIG. 5 is a cross-sectional view taken along line 5-5 of FIG. 3.
Figure 6:
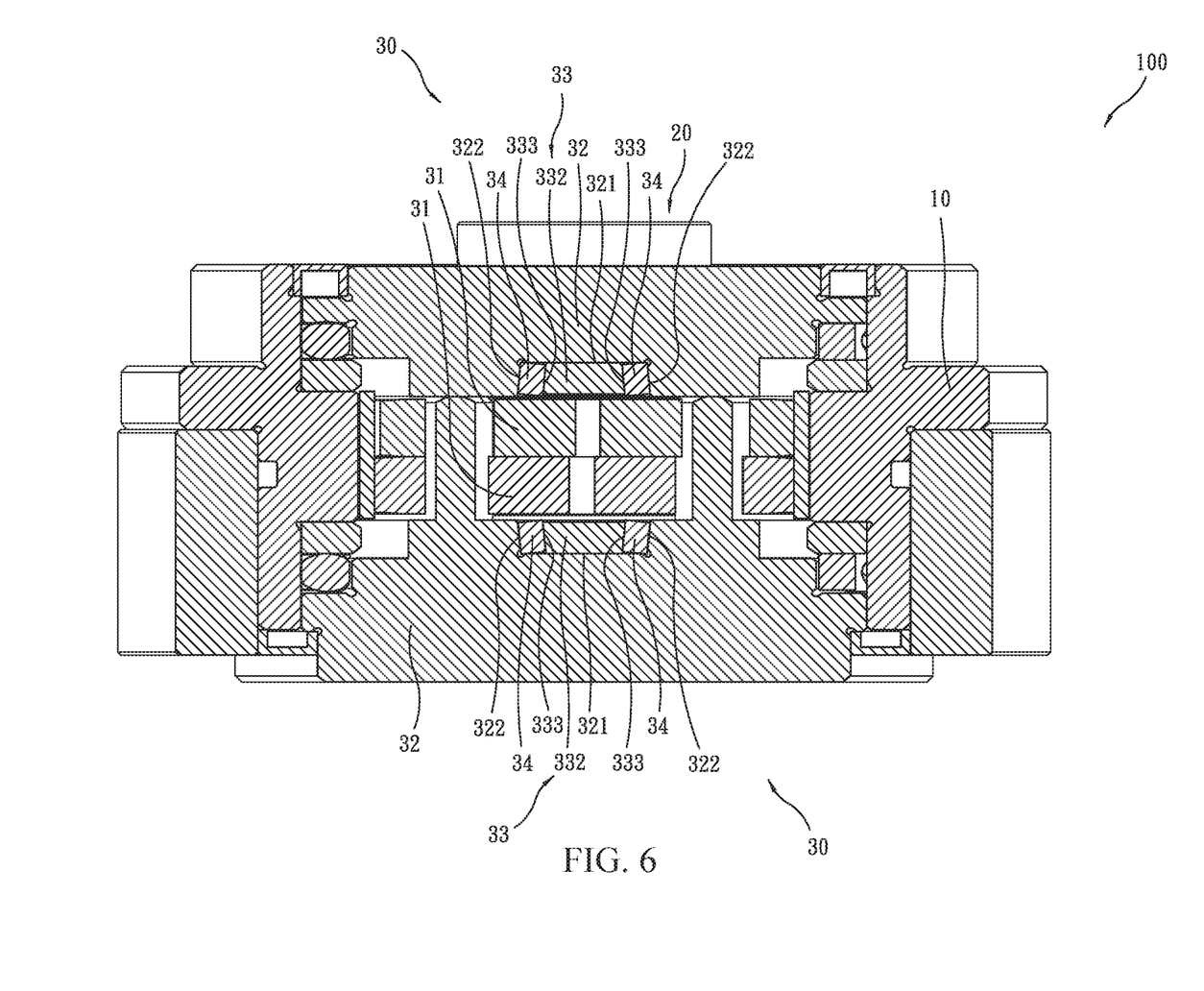
FIG. 6 is a cross-sectional view showing another embodiment of the present invention.
Figure 7:
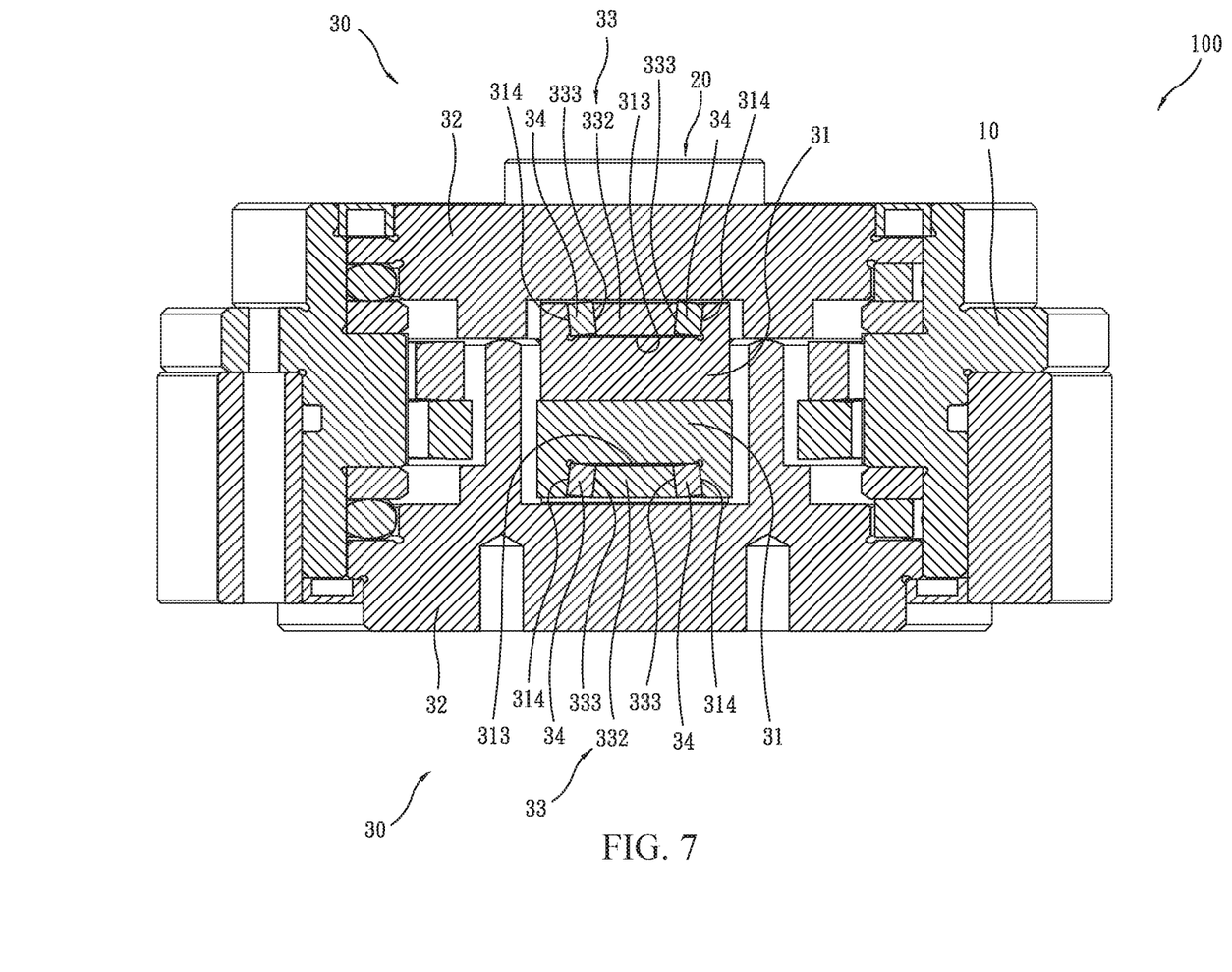
FIG. 7 is a cross-sectional view showing another embodiment of the present invention.

Further, in the above-described embodiment, the cycloidal disc troughs 313 of the cycloidal disc 31 are arranged such that one of the sidewalls thereof is formed as an inclined surface 314; the coupling sections 332 of the cross Oldham coupling member 33 are arranged such that one of the sidewalls is formed as an inclined surface 333; and the output member troughs 321 of the output member 32 are arranged such that one of the sidewalls thereof is formed as an inclined surface 322, yet in embodiments illustrated in FIGS. 6 and 7, the two opposite sidewalls of each of the cycloidal disc troughs 313 of the cycloidal disc 31 can be both formed as inclined surfaces 314; the two opposite sidewalls of each of the coupling sections 332 of the cross Oldham coupling member 33 can be both formed as inclined surfaces 333; and the two opposite sidewalls of each of the output member troughs 321 of the output member 32 can be both formed as inclined surfaces 322. Such arrangements provide the same efficacy.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A cycloidal reducer, comprising:
a housing, which comprises an axial mounting hole and an internal ring gear formed on an inner circumferential surface of the axial mounting hole;
an input bushing, which is mounted in the axial mounting hole of the housing for input of a rotational force; and
two speed-reduced output units, which are arranged in the axial mounting hole of the housing, the two speed-reduced output units being arranged in opposite directions of a common axis, each of the speed-reduced output units comprising a cycloidal disc, an output member, a cross Oldham coupling member, and a plurality of rolling elements, the cycloidal disc comprising a mounting hole extending therethrough in an axial direction, an external ring gear formed on an outer circumferential surface of the cycloidal disc, and a plurality of cycloidal disc troughs formed in an end face of the cycloidal disc as recessing in the axial direction, the mounting hole receiving the input bushing to fit therein, the external ring gear being set in engagement with the internal ring gear of the housing, each of the cycloidal disc troughs having sidewalls of which one is formed as an inclined surface, each of the cycloidal disc troughs having a bottom wall that defines a planar surface, the inclined surface of the cycloidal disc and the axial direction of the cycloidal disc forming therebetween an included angle, which is in a range between 1 degree and 18 degrees, the output member having an end face that comprises a plurality of output member troughs formed therein as recessing in the axial direction, the cross Oldham coupling member comprising a central ring section and four coupling sections extending radially from the central ring section in the form of a cross, each of the coupling sections having sidewalls of which one is formed as an inclined surface, the inclined surface of the cross Oldham coupling member and the axial direction of the cross Oldham coupling member forming therebetween an included angle, which is in a range between 1 degree and 18 degrees, two of the coupling sections of the cross Oldham coupling member being respectively received in the cycloidal disc troughs of the cycloidal disc, the other two of the coupling sections of the cross Oldham coupling member being respectively received in the output member troughs of the output member, the rolling elements being arranged between the inclined surfaces of the cycloidal disc and the inclined surfaces of the cross Oldham coupling member and between the sidewalls of the output member troughs of the output member and the sidewalls of the coupling sections of the cross Oldham coupling member, an end face of the rolling element and the planar surface of the bottom wall of the cycloidal disc trough forming a gap defining an included angle in a range between 1 degree and 18 degrees, the rolling elements being cylindrical rollers.

2. The cycloidal reducer according to claim 1, wherein two opposite sidewalls of the cycloidal disc troughs are both formed as inclined surfaces, and two opposite sidewalls of the coupling sections of the cross Oldham coupling member are both formed as inclined surfaces.

3. The cycloidal reducer according to claim 1, wherein the planar surface of the bottom wall of the cycloidal disc trough is connected to the inclined surface of the cycloidal disc trough with an obtuse angle formed therebetween and an scape groove is formed in the connection between the planar surface of the bottom wall of the cycloidal disc trough and the inclined surface of the cycloidal disc trough in a recessed form.

4. The cycloidal reducer according to claim 1, wherein the included angle between the end face of the rolling element and the planar surface of the bottom wall of the cycloidal disc trough is in the range between 5 degrees and 15 degrees.

5. A cycloidal reducer, comprising:
a housing, which comprises an axial mounting hole and an internal ring gear formed on an inner circumferential surface of the axial mounting hole;
an input bushing, which is mounted in the axial mounting hole of the housing for input of a rotational force; and
two speed-reduced output units, which are arranged in the axial mounting hole of the housing, the two speed-reduced output units being arranged in opposite directions of a common axis, each of the speed-reduced output units comprising a cycloidal disc, an output member, a cross Oldham coupling member, and a plurality of rolling elements, the cycloidal disc comprising a mounting hole extending therethrough in an axial direction, an external ring gear formed on an outer circumferential surface of the cycloidal disc, and a plurality of cycloidal disc troughs formed in an end face of the cycloidal disc as recessing in the axial direction, the mounting hole receiving the input bushing to fit therein, the external ring gear being set in engagement with the internal ring gear of the housing, the output member having an end face that comprises a plurality of output member troughs formed therein as recessing in the axial direction, each of the output member troughs having sidewalls of which one is formed as an inclined surface, each of the output member troughs having a bottom wall that defines a planar surface, the inclined surface of the output member and the axial direction of the output member forming therebetween an included angle, which is in a range between 1 degree and 18 degrees, the cross Oldham coupling member comprising a central ring section and four coupling sections extending radially from the central ring section in the form of a cross, each of the coupling sections having sidewalls of which one is formed as an inclined surface, the inclined surface of the cross Oldham coupling member and the axial direction of the cross Oldham coupling member forming therebetween an included angle, which is in a range between 1 degree and 18 degrees, two of the coupling sections of the cross Oldham coupling member being respectively received in the cycloidal disc troughs of the cycloidal disc, the other two of the coupling sections of the cross Oldham coupling member being respectively received in the output member troughs of the output member, the rolling elements being arranged between the sidewalls of the cycloidal disc troughs of the cycloidal disc and the sidewalls of the coupling sections of the cross Oldham coupling member and between the inclined surfaces of the output member and the inclined surfaces of the cross Oldham coupling member, an end face of the rolling element and the planar surface of the bottom wall of the output member trough forming a gap defining an included angle in a range between 1 degree and 18 degrees, the rolling elements being cylindrical rollers.

6. The cycloidal reducer according to claim 5, wherein two opposite sidewalls of the output member troughs of the output member are both formed as inclined surfaces and two opposite sidewalls of the coupling sections of the cross Oldham coupling member are both formed as inclined surfaces.

7. The cycloidal reducer according to claim 5, wherein the planar surface of the bottom wall of the output member trough is connected to the inclined surface of the output member trough with an obtuse angle formed therebetween and an scape groove is formed in the connection between the planar surface of the bottom wall of the output member trough and the inclined surface of the output member trough in a recessed form.

8. The cycloidal reducer according to claim 5, wherein the included angle between the end face of the rolling element and the planar surface of the bottom wall of the output member trough is in the range between 5 degrees and 15 degrees.

* * * * *